(12) United States Patent
Blanchard et al.

(10) Patent No.: US 10,767,055 B2
(45) Date of Patent: Sep. 8, 2020

(54) MINERAL MATERIAL POWDER WITH HIGH DISPERSION ABILITY AND USE OF SAID MINERAL MATERIAL POWDER

(71) Applicant: Omya International AG, Oftringen (CH)

(72) Inventors: Pierre Blanchard, Reyrieux (FR); Jean-Pierre Elgoyhen, Bures-sur-Yvette (FR); Beat Karth, Oberoenz (CH); Holger Müller, Rheinfelden (DE); Jürgen Spehn, Safenwil (CH); Martin Brunner, Wallbach (CH); Pascal Gonnon, Villeneuve (FR); Michael Tinkl, Gipf-Oberfrick (CH)

(73) Assignee: Omya International AG, Oftringen (CH)

( * ) Notice: Subject to any disclaimer, the term of this patent is extended or adjusted under 35 U.S.C. 154(b) by 424 days.

(21) Appl. No.: 14/372,603

(22) PCT Filed: Feb. 14, 2013

(86) PCT No.: PCT/EP2013/052940
§ 371 (c)(1),
(2) Date: Jul. 16, 2014

(87) PCT Pub. No.: WO2013/120934
PCT Pub. Date: Aug. 22, 2013

(65) Prior Publication Data
US 2015/0000564 A1    Jan. 1, 2015

Related U.S. Application Data

(60) Provisional application No. 61/601,677, filed on Feb. 22, 2012.

(30) Foreign Application Priority Data

Feb. 17, 2012 (EP) ..................................... 12156090

(51) Int. Cl.
*C09D 1/00* (2006.01)
*B02C 23/36* (2006.01)
(Continued)

(52) U.S. Cl.
CPC ................ *C09D 1/00* (2013.01); *B02C 23/36* (2013.01); *C04B 14/28* (2013.01); *C08K 3/26* (2013.01);
(Continued)

(58) Field of Classification Search
CPC ....... C04B 14/28; C04B 14/285; C09C 1/021; C09C 3/04; C08K 3/26; C08K 3/265;
(Continued)

(56) References Cited

U.S. PATENT DOCUMENTS 5,145,902 A * 9/1992 Ravet .................... C01F 11/185
524/425
5,533,678 A 7/1996 Strauch et al.
(Continued)

FOREIGN PATENT DOCUMENTS

CA    1161010 A1 * 1/1984
EP    0614948 A1 * 9/1994 ............ C01F 11/185
(Continued)

OTHER PUBLICATIONS

International Search Report dated Mar. 11, 2013 for PCT Application No. PCT/EP2013/052940.
(Continued)

*Primary Examiner* — Jun Li
(74) *Attorney, Agent, or Firm* — ALGM LLP; Harry J. Guttman

(57) ABSTRACT

The present invention refers to a mineral matter powder preparation by wet process without acrylic additive or other grinding aid additives and to the use of said mineral matter
(Continued)

after an optional hydrophobic treatment. Said mineral material having superior dispersing properties.

14 Claims, 3 Drawing Sheets

(51) Int. Cl.
　　C08K 3/26　　(2006.01)
　　C04B 14/28　　(2006.01)
　　C08K 9/04　　(2006.01)
　　C09C 1/02　　(2006.01)
　　C09C 3/04　　(2006.01)
　　D21H 17/00　　(2006.01)
　　D21H 17/63　　(2006.01)
　　D21H 17/67　　(2006.01)
　　D21H 17/68　　(2006.01)
　　D21H 19/38　　(2006.01)
　　D21H 19/40　　(2006.01)
　　D21H 21/52　　(2006.01)
　　D21H 17/66　　(2006.01)

(52) U.S. Cl.
　　CPC ............... *C08K 9/04* (2013.01); *C09C 1/021* (2013.01); *C09C 3/04* (2013.01); *D21H 17/00* (2013.01); *D21H 17/63* (2013.01); *D21H 17/66* (2013.01); *D21H 17/67* (2013.01); *D21H 17/675* (2013.01); *D21H 17/68* (2013.01); *D21H 19/38* (2013.01); *D21H 19/385* (2013.01); *D21H 19/40* (2013.01); *D21H 21/52* (2013.01); *C01P 2004/03* (2013.01); *C01P 2004/62* (2013.01); *C01P 2006/12* (2013.01); *C01P 2006/22* (2013.01); *C01P 2006/60* (2013.01); *C08K 2003/265* (2013.01); *Y10T 428/2982* (2015.01); *Y10T 428/2991* (2015.01)

(58) Field of Classification Search
　　CPC .......... C08K 2003/265; C08K 2003/26; C08K 2003/262; C08K 2003/267; C09D 1/00; D21H 19/385; D21H 19/40; D21H 17/68; D21H 17/675; D21H 17/67; D21H 17/63; B02C 23/36
　　See application file for complete search history.

(56) References Cited

U.S. PATENT DOCUMENTS

| | | | |
|---|---|---|---|
| 5,873,935 A | 2/1999 | Schachenmann et al. | |
| 5,879,442 A * | 3/1999 | Nishiguchi | C01F 11/185 106/464 |
| 2005/0119419 A1 | 6/2005 | Blanchard et al. | |
| 2009/0162638 A1* | 6/2009 | Buri | B82Y 30/00 428/323 |
| 2009/0209692 A1* | 8/2009 | Suau | C09C 1/02 524/421 |
| 2009/0324979 A1* | 12/2009 | Roussel | B32B 27/20 428/523 |
| 2010/0000693 A1* | 1/2010 | Champ | D21F 11/04 162/123 |
| 2010/0095869 A1 | 4/2010 | Dupont et al. | |
| 2011/0259537 A1* | 10/2011 | Husband | D21B 1/30 162/4 |
| 2012/0227632 A1 | 9/2012 | Kanduth et al. | |
| 2012/0264866 A1* | 10/2012 | Knerr | C08L 33/08 524/425 |
| 2013/0137779 A1* | 5/2013 | Wimmer | C09C 1/021 514/770 |

FOREIGN PATENT DOCUMENTS

| | | |
|---|---|---|
| EP | 1752499 A1 | 2/2007 |
| FR | 2910479 A1 | 6/2008 |
| JP | S56-74162 A | 6/1981 |
| WO | 03066692 A1 | 8/2003 |
| WO | 2005075353 A1 | 8/2005 |
| WO | 2010030579 A1 | 3/2010 |

OTHER PUBLICATIONS

Written Opinion of the International Searching Authority dated Mar. 11, 2013 for PCT Application No. PCT/EP2013/052940.
Zeng et al. "Influence of the diameter of CaCO3 particles on the mechanical and rheological properties of PVC composites." J. Mater. Sci. (2008) No. 43, pp. 3503-3509.
Office Action dated Sep. 5, 2018 from Argentinian Application No. 20130100476.
Office Action dated Nov. 6, 2014 from Australian Application No. 2013220423.
Office Action dated Dec. 7, 2015 from Canadian Application No. 2,864,760.
Office Action dated Nov. 15, 2016 from Canadian Application No. 2,864,760.
Office Action dated Jun. 19, 2018 from Chinese Application No. 201710270829.7.
Office Action dated Jul. 19, 2016 from the Cooperation Council for The Arab States of the Gulf Application No. GC 2013-23578.
Office Action dated Dec. 9, 2017 Under Memorandum of Understanding between The Cooperation Council for The Arab States of the Gulf and People's Republic of China Application No. GC 2013-23578.
Office Action dated Aug. 18, 2015 from Japanese Application No. 2014-557033.
Office Action dated Nov. 13, 2015 from Russian Application No. 2014137449.
Office Action dated Dec. 13, 2015 from Korean Application No. 10-2014-7023207.
Office Action dated Jun. 3, 2016 from Taiwanese Application No. 102105498.

\* cited by examiner

Formulation: 20wt% $CaCO_3$ + 80wt% LLDPE Dowlex 5056G
(Blown Film: grammage / thickness: 24 g/m2 – 26 microns)

100% Polymer

20wt% Invention

20wt% PA1

20wt% PA2

Formulation: 10wt% $CaCO_3$ + 90wt% LLDPE Dowlex 5056G
(Blown Film : grammage / thickness: 23 g/m2 – 22.5 microns)

100wt% Polymer

10wt% Invention

10wt% PA1

MINERAL MATERIAL POWDER WITH HIGH DISPERSION ABILITY AND USE OF SAID MINERAL MATERIAL POWDER

CROSS-REFERENCE TO RELATED APPLICATIONS

This application is a U.S. national phase of PCT Application No. PCT/EP2013/052940, filed Feb. 14, 2013, which claims priority to European Application No. 12156090.8, filed Feb. 17, 2012 and U.S. Provisional Application No. 61/601,677, filed Feb. 22, 2012.

The present invention refers to a mineral material powder preparation by wet process without acrylic additive or other grinding aid additives and to the use of said mineral material after an optional hydrophobic treatment. Said mineral material having superior dispersing properties.

The present invention further refers to the use of such processed mineral material as mineral filler, and in particular as mineral filler in paper, paint, coatings, thermoplastic or thermoset resins, rubbers, food, food packaging, cosmetics, pharmaceuticals, and concrete or mortars.

The invention in particular concerns the manufacture of plastics and in particular thermoplastic resins such as polyolefin, or PVC resins. Today part of the costly resins are replaced regularly with less expensive fillers and/or pigments materials in order to reduce costs, while at the same time trying to improve mechanical and/or optical properties of the unfilled material.

The amounts of fillers present in thermoplastic polymers such as polyolefins are generally in the range from about 0.1% by weight to about 70% by weight, whereas in thermoplastic resins such as various PVC's the fillers are present in amounts from about 1 phr to about 200 phr. In particular applications the filler can reach even 400 phr e.g. in cable bedding. Phr has the meaning of parts per hundred resins in term of weight. Such amounts generally allow for a normal processing of the thermoplastic polymers.

Said fillers are frequently selected from natural or synthetic calcium carbonate, dolomites, magnesium hydroxide, kaolin, talc, gypsum or titanium oxide, and are incorporated in the polymer matrix directly, in the form of a compound, a dry blend, a masterbatch, or granulates.

However, fine powders, prepared by the methods known in the art comprising dispersing agents, have a strong tendency to form agglomerates after drying. Such agglomerates make them difficult to be well dispersed in final mixtures such as polymer matrices, paints, coatings or mortars. To overcome such dispersing problems, the dried and agglomerated particles are frequently submitted to a de-agglomeration step in order to break up said agglomerates and to promote dispersion. However, said de-agglomeration step is not always sufficient enough and therefore also dispersion of such material is not satisfactory, leading to deficiencies and unwanted effects in the final products.

Frequently mineral material is mixed with dispersing agents in order to allow for wet grinding at high solids contents. Current prior art tries to provide solutions to overcome the problem of agglomerates. Fine mineral materials are made into masterbatches for easier dosage and better dispersion into the polymer matrix. In some applications the mineral filler are optionally surface treated.

WO 00/20336 refers to an ultrafine natural calcium carbonate, optionally treated with one or several fatty acids or one or several salts or mixtures thereof, and its use as a rheology regulator for polymer compositions. The specific surface area is 14 $m^2/g$ to 30 $m^2/g$ measured according to the BET method to ISO Standard 4652.

WO 03/066692 refers to a binding agent used in a masterbatch to allow re-dispersion of mineral material in thermoplastic resins.

WO 2005/075353 refers to a natural particulate carbonate, wherein the dispersant employed during wet grinding is minimized or removed at a later stage by washing, and subsequent dewatering leads to a product with reduced surface moisture content at around 0.2 wt %. Remainders of dispersant chemicals are not greater than 0.05 wt % based on the dry weight of the carbonate. Where the carbonate is to be surface coated with a hydrophobising surface treatment agent, a second heating step is used; the second heating step may be applied before and/or during the surface treatment step. Surface treatment agents may comprise an aliphatic carboxylic acid.

WO 2010/030579 refers to stearic acid treated calcium carbonate having low or no detectable free stearic acid. The method for treating calcium carbonate includes the combination of calcium carbonate, water and stearic acid, wherein the amount of water is at least 0.1% by weight relative to the total weight.

US 2004/097616 refers to a treated particulate calcium carbonate. Said treatment being carried out in two steps. The first treatment (pre-treatment) step comprises treatment with at least one polydialkylsiloxane and a second step comprising a treatment by at least one fatty acid containing more than 10 carbon atoms, the two steps being able to be carried out simultaneously.

Facing the dispersing problems, the inventors have surprisingly found that preparing a ground mineral material without the use of any dispersants all along the process allows solving the dispersing problems in final compositions.

The present invention is therefore aimed at a ground natural mineral material and at a process for the preparation of said ground natural mineral material with good dispersing ability, and with a solid content of said mineral material of up to about 99.8 wt %, prepared in a wet process without acrylic additives or polyphosphates or other grinding aid additives, such acrylic additives or other grinding aid additives being known to the skilled person from the prior art such as WO 03/066692, or EP-A-0380430.

A further aspect of the present invention is to provide for a ground natural mineral material with good dispersing ability in thermoplastic resins such as polyolefins or PVC resins, polyesters, acrylic resins, polyurethane resins, or thermoset resins such as polyurethane foams, (e.g. flexible polyurethane foam), rubbers, unsaturated polyesters, or vulcanized rubbers.

A further aspect of the present invention is directed to a thermoplastic polymer product comprising the mineral material of the present invention.

Another aspect of the present invention is directed to a thermoset polymer product comprising the mineral material of the present invention.

A still further aspect of the present invention is directed to the use of the mineral material of the present invention in thermoplastic resins such as polyolefins, styrenic resins, acrylic resins, polycarbonate resins, polyester resins, polyurethane resins, polyamide resins, halogenated polymer resins and combinations thereof.

In yet another aspect of the present invention the halogenated polymer resin is preferably selected from the group comprising PVC, post-chlorinated vinyl polychloride PVCC, vinylidene polyfluoride PVDF or mixtures thereof.

A still further aspect of the present invention is directed to a thermoplastic PVC product, wherein the mineral material of the present invention is present in amounts from about 1 phr to 200 phr, preferably from about 5 phr to about 19 phr, still more preferably from about 6 phr to about 18 phr, and still more preferably from about 7 phr to about 17 phr, and wherein the thermoplastic PVC product has a charpy impact strength of from 10 kJ/m2 to about 140 kJ/m2, measured according to ISO 179/1eA on extruded samples. Further the thermoplastic PVC product has as gloss 60° [–] from about 20 to about 60, preferably from about 40 to about 60, still more preferably from about 42 to 55.

A still further aspect of the present invention is directed to the use of the mineral product of the present invention as well as in intermediate and/or final products made of such thermoplastic polymer product or thermoset material.

Such thermoplastic polymer product comprising the mineral material of the present invention comprise at least one thermoplastic polymer selected from the group comprising polyolefins, styrenic resins, acrylic resins, polycarbonate resins, polyester resins, polyurethane resins, polyamide resins, halogenated polymer resins and combinations thereof.

Final thermoplastic polymer products are profiles, such as window profiles, pipes, and technical profiles such as cable- or wire conducts wall-, ceiling-, or cladding panels, wire insulations; fibers and non-wovens, cast films, such as breathable films, raffia, bi-oriented polypropylene film or blown films, such as mono- or multilayer films made form high density polyethylene (HDPE), or linear low density polyethylene (LLDPE), or polypropylene (PP) or mixtures thereof. The mixtures referring to mixed layers. However not only final products but also intermediate products can be prepared. Such intermediate products encompass products made by processes comprising an extrusion step, such as injection moulding, blow moulding, or casting and the resulting products such as sheets, films or bottles and profiles. It shall be understood, that the processes mentioned here are of mere illustrative purpose and thus shall not be construed as limiting the invention to these processes.

Intermediate products like masterbatch, compound, dry-blend or granulates are encompassed by the present invention as well as other types of final products such as non-woven fibres, spun laid fibres, mono- or multifilament products.

The invention will now be further described.

Mineral materials are in general mined materials from quarries and to some extend also prepared by synthetic methods.

Mined mineral material form the quarries are further processed according to their final intended use. Basically the mined rocks undergo a first size reduction by jaw crushers or the like before entering the subsequent milling processes. Such milling or grinding processes being generally performed in dry or in wet, and hence also named so, dry milling or grinding or wet milling or grinding such processes being known to the skilled person.

In general, relevant processing agents are present during wet grinding in order to improve the viscosity during the wet grinding. Such relevant processing agents affecting the viscosity are known to the skilled person and can be found among organic or inorganic materials, chemicals or molecules.

The ground mineral material of the present invention is obtained by a process comprising the steps of:
a) Wet grinding the mineral material in at least one grinding step in aqueous suspension or slurry until the mineral material has a weight median particle diameter $d_{50}$ from 0.1 µm to 1.5 µm, preferably from 0.4 µm to 1.1 µm, more preferably from 0.6 µm to 0.9 µm, and most preferably of 0.8 µm, and wherein in the at least one grinding step no relevant processing agents are present.
b) Optionally up-concentrating or dewatering the aqueous suspension or slurry of step b) to achieve a solid content of between 50% and 70%, preferably between 55% and 65%, and most preferably of 60% by weight of dry matter, said mineral matter having weight median particle diameter $d_{50}$, from 0.1 µm to 1.5 µm, preferably from 0.4 µm to 1.1 µm, more preferably from 0.6 µm to 0.9 µm, and most preferably of 0.8 µm.
c) Drying the aqueous suspension or slurrry of step a) or b) to achieve a mineral matter with a solids content of 99.8%, wherein no relevant processing agents are present.
d) Optionally surface treatment of the product of step c) with at least one aliphatic carboxylic acid.

However, in certain cases, it might be advisable to perform a de-agglomeration of the product obtained at step d).

Accordingly, the process according to the present invention is characterized in that it comprises a step e) of de-agglomeration of the product of step d).

The process of the present invention, may still further comprise in step a) at least one grinding step wherein the solids content is from 10 wt % to 40 wt %, preferably from 20 wt % to 30 wt %, and mandatory step b), wherein in the grinding steps no relevant processing agents are present.

The mineral material to be used in the above mentioned process can be any natural or synthetic calcium carbonate or calcium carbonate comprising material selected from the group comprising marble, chalk, dolomite, calcite, limestone, magnesium hydroxide, talc, gypsum, titanium oxide or mixtures thereof.

The wet fine grinding of the process described above can be carried out by processes known to the skilled person, such as described in U.S. Pat. Nos. 5,533,678 or 5,873,935.

The optional up-concentration or dewatering step in the process described above is carried out be means know to the skilled person such as by mechanical- and/or thermal up-concentration and/or combinations thereof.

Mechanical up-concentration or dewatering can be carried out by centrifugation or by filter pressing. Thermal up-concentration methods such as solvent evaporation by heat or by flash-cooling. Preferably the up-concentration step in the present invention is carried out by centrifugation.

The drying step in the process described above is carried out by means known to the skilled person and can be selected from the group such as atomizing, spray drying, drying in a rotational oven, drying in a pond, jet-drying, fluid bed drying, freeze drying, fluidized spray drying, or other means suitable for this purpose such as fountain nozzle drying, preferably by spray-drying.

The optional surface treatment of the dried mineral matter product resulting from dewatering or drying step can made in pin-mill with preheated material, in an attritor mill, cell mill, in a speed mixer, in a dry melt coating, in a fluidized bed, or any other device suitable for this purpose and known to the skilled person.

The optional surface treatment step can be made after the drying step or as an alternative during the drying step, wherein the surface treatment product is added after the drying step, and in the alternative way before or during the drying step.

Said optional treatment being carried out with a surface treatment product in amounts from about 0.01 wt % to about 4 wt %, preferably in amount from about 0.02 wt % to about 2 wt %, more preferably in amounts from about 0.03 wt % to about 1 wt % of the mineral matter.

Said surface treatment product being at least one aliphatic carboxylic acid selected from the group comprising butanoic acid, pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, lignoceric acid, their esters and/or salts and/or mixtures thereof.

Within the meaning of the present invention, the at least one aliphatic carboxylic acid refers to straight or linear chain, branched chain, saturated, unsaturated or alicyclic organic compounds composed of carbon and hydrogen. Said organic compound further contains a carboxyl group placed at the end of the carbon skeleton which in the case of esters is esterified with C1 to C9 alcohols, preferably mono-alcohols selected from the group comprising, methanol, ethanol, propanol, i-propanol, butanol, i-butanol, pentanol, i-pentanol, 1-hexanol, 2-hexanol, i-hexanol, 1-hepantol, 2-heptanol, i-heptanol, 1-octanol, 2-octanol, i-octanol, 1-nonanol, 2-nonanol, i-nonanol and mixtures thereof.

The product thus obtained by the above described process is a mineral material optionally coated with at least one aliphatic carboxylic acid wherein the untreated mineral material has a median particle size diameter $d_{50}$ from 0.1 μm to 1.5 μm, preferably from 0.4 μm to 1.1 μm, more preferably from 0.6 μm to 0.9 μm, and most preferably of 0.8 μm.

Said untreated mineral material further having a BET/$N_2$ specific surface area from 3 $m^2/g$ to 13 $m^2/g$, preferably from 4 $m^2/g$ to 12 $m^2/g$, more preferably from 5 $m^2/g$ to 10 $m^2/g$, still more preferably from 6 $m^2/g$ to 9 $m^2/g$, and still more preferably from 7 $m^2/g$ to 8 $m^2/g$. Said method being described by Brunauer, St., Emmett, P. H., Teller, E. (1938): Adsorption of Gases in Multimolecular Layers, J. Am. Chem. Soc., 60, 309.

Further to this, the optionally coated mineral material obtained by the above described process has a top cut $d_{98}$ equal or below 6 μm, such as from about 5.9 μm to about 1.8 μm, preferably from about 5 μm to about 1.8 μm, more preferably from about 4 μm to about 2.5 μm.

The surface area of the mineral material of the present invention coated with the at least one aliphatic carboxylic acid refers to the surface area of the mineral material which is accessible or exposed to the at least one aliphatic carboxylic acid applied by coating techniques know to the skilled person, such as hot fluidised bed spray coating, hot-wet coating, solvent-assisted coating or self-assembly coating and the like, thereby forming a monolayer of aliphatic carboxylic acid on the surface of the mineral material particle. In this regard, it should be noted that the amount of aliphatic carboxylic acid which is required for full saturation of the accessible surface area is defined as a monolayer concentration. Higher concentrations thus can be chosen as well thereby forming bi-layered of multi-layered structures on the surface of the mineral material particle. Such monolayer concentrations can be readily calculated by skilled person, based on the publication of Papier, Schultz and Turchi (Eur. Polym. J. Vol. 20, No. 12, pp 1155-1158, 1984).

As previously described, one aspect of the present invention is to provide for a mineral material with good dispersing ability in final mixtures such as polymer matrices, paints, coatings or mortars.

A further aspect of the present invention is the use of the mineral filler obtained by the process of the present invention, in paper, paint, coatings, thermoplastic or thermoset resins, rubbers, food, food packaging, cosmetics, pharmaceuticals, mortars or concrete.

Further the present invention refers to a process for producing said mineral material and to the use of said mineral material in thermoplastic resins such as polyolefins or PVC resins or thermoset resins as well as intermediate and/or final products made of such thermoplastic or thermoset material comprising the mineral material of the present invention. And finally the invention refers also to the thermoplastic resins such as polyolefins or PVC resins or thermoset resins comprising said mineral material.

The thermoplastic polymer is further selected from the group comprising polyolefines, styrenic resins, acrylic resins, polycarbonate resins, polyamide resins, halogenated polymer resins, bioplastics, bio-degradable polymers, or combinations thereof.

The thermoset resins are chosen from but not limited to flexible polyurethane foams and unsaturated polyesters.

If the polymer resin is a halogenated polymer resin, the halogenated polymer resin is preferably selected from the group comprising PVC, plasticized PVC, unplasticized PVC, post-chlorinated vinyl polychloride CPVC, vinylidene polyfluoride PVDF or mixtures thereof.

Before PVC can be made into finished products, it always requires conversion into a compound or dry blend by incorporation of additives such as but not limited to heat stabilizers, UV stabilizers, lubricants, plasticizers, processing aids, impact modifiers, thermal modifiers, fillers, flame retardants, biocides, blowing agents, smoke suppressors and optionally pigments.

The amount of mineral matter filler in thermoplastic PVC resins is in the range from about 1 phr to about 200 phr. In thermoplastic PVC window profiles the amount of mineral material is in the range from about 1 phr to about 20 phr, preferably from about 5 phr to about 19 phr, still more preferably from about 6 phr to about 18 phr, and still more preferably from about 7 phr to about 17 phr.

The term "phr" in the meaning of the present invention means "parts per hundred resins". In particular, if 100 parts of polymer are used, the quantity of other ingredients is expressed in relation to these 100 parts of polymer by weight.

The mineral matter filler of the present invention can be present in thermoplastic PVC resins in amounts from or more than 4 phr in respect to the thermoplastic material, preferably in amount of at least 9 phr, of at least 10 phr, of at least 11 phr, of at least 12 phr, of at least 13 phr, of at least 14 phr, of at least 15 phr, of at least 16 phr, of at least 17 phr, of at least 18 phr, or of at least 19 phr, when incorporated into thermoplastic PVC window profile.

Such thermoplastic PVC resins have the advantage that their mechanical or optical properties such as processability, gloss and/or impact strength are hereby not affected or only little, i.e. within the deviation limits accepted by the industries and/or client.

An important side effect is that due to the replacement of polymer resin in amounts of up to 200 phr, final thermoplastic PVC parts can be produced more cost efficient. The skilled person thus will easily recognize that use of less thermoplastic polymer material in final products will significantly reduce cost of the final products such as profiles, e.g. window profiles, pipes, technical profiles such as cable- or wire conducts, wall-, ceiling-, or cladding panels, wire insulations, fibres and non-wovens.

However not only final products but also intermediate products can be prepared. Such intermediate products encompass products made by processes comprising an extrusion step, such as injection moulding, blow moulding, or casting and the resulting products such as profiles, sheets, films or bottles. It shall be understood, that the processes mentioned here are of mere illustrative purpose and thus shall not be construed as limiting the invention to these processes.

PVC can be further divided into rigid PVC, plasticized PVC and plastisols with their corresponding final products or application. Rigid PVC is generally used in profiles, such as such as window profiles, comprising mineral fillers from 1 phr to about 12 phr, in sidings, comprising mineral fillers from 1 phr up to 100 phr, in tubes or pipes, comprising mineral fillers from 1 phr up to 60 phr. Plasticized PVC is generally used in flooring, comprising mineral fillers from about 1 phr up to 200 phr, in cable conducts, comprising mineral filler from about 1 phr up to 150 phr. Plastisols are generally used in underbody car material, comprising mineral fillers in amounts from about 1 phr to up to 200 phr. Mineral fillers such as $CaCO_3$, are thus generally employed in amounts from about 1 phr to about 200 phr. In particular applications, such as profiles e.g. window profiles, this amount is generally in the range from about 1 phr to about 20 phr. The amount of filler described above are not fix and the upper limits thus may still vary up or down by to 10 to 50%.

If the polymer resin is a styrenic resin, the polymer resin is preferably selected from the group comprising general purpose polystyrene (GPPS), high impact polystyrene (HIPS), styrene-butadiene copolymers, block copolymers of the Kraton™ type, resins of the styrene-acrylonitrile type, acrylate-butadiene-styrene resins, methylmethacrylate styrene copolymers and mixtures thereof.

If the polymer resin is an acrylic resin, the polymer is preferably a methyl polymethyacrylate.

If the polymer resin is a polyolefin resin, the polyolefin resin is preferably selected from the group comprising homopolymers and/or copolymers of polyethylenes (crosslinked or non-crosslinked polyethylene) and/or propylenes and/or mixtures thereof. Polyethylenes can be further subdivided into HDPE, LDPE, LLDPE.

If the polymer is a polyester resin, the polymer resin is preferably selected from the group comprising polyethylene terephthalate (PET) and/or the polybutylene terephthalate, polycarbonates, as well as thermoplastic resins comprising phthalate esters such as iso-phthalate esters.

Within the context of the present invention bioplastics are a form of plastics derived from renewable biomass sources such as vegetable fats and oils, corn, starch, pea starch, or microbiota, rather than fossile-fuel plastics which are derived from crude oil fractions. Some, but not all bioplastics are designed to biodegrade, such as polylactic acid plastics (PLA), or polyhydroxyalkanoate bioplastics (PHA). Starch based bioplastics, usually made of amylose or amylosepectin, are often blended with biodegradable polyesters. These blends are mainly starch/polycaprolactone (PCL-blend), or starch/polybutylene adipate-co-therephthalate. Other bioplastics or biodegradable bioplastics are further described in the literature and/or the Internet.

In a preferred embodiment the thermoplastic resin is selected from Polyvinylchloride.

Preferably the polyvinylchloride resin comprises a polyvinyl chloride homopolymer or a copolymer of vinylchloride with a copolymerizable ethylenically unsaturated monomer. Depending on the use of the final PVC products the appropriate K-value is chosen. The K-value is a measure of the molecular weight of PVC based on measurements of viscosity of a PVC solution. It ranges usually between 35 and 80. Low K-values imply low molecular weight (which is easy to process but has inferior properties) and high K-values imply high molecular weight, (which is difficult to process, but has outstanding properties).

Polyvinylchloride resins suitable for the use in the present invention are available from a wide variety of commercial sources. Such as polyvinylchloride from INEOS Chlor Americas Inc, Shin-Etsu, Vestolit, LVM, Aiscondel, Cires, Solvin, Arkema, or Vinnolit.

In a preferred embodiment, the thermoplastic PVC resin composition comprises the mineral matter material of the present invention in amounts of from 4 phr to about 19 phr. The thermoplastic PVC resin composition may comprise further additives generally used for preparing the final thermoplastic PVC polymer products such as window profiles. Such additives may be added for the purpose of e.g. increasing impact resistance, melt elasticity, stability and resistance to oxidation of the polymer product. The thermoplastic PVC resin composition may further comprise at least one of the components selected from the group comprising, stabilizers, impact modifiers, lubricating agents, processing aids, pigments and combinations thereof.

In one embodiment the thermoplastic PVC resin composition comprising the mineral material of the present invention in amounts from 1 phr to 20 phr, further comprises at least one stabilizer. Such stabilisers are known in the art and are provided from manufacturers such as Baerlocher or Crompton Corp. The stabilizers are typically selected from Pb containing stabilizers, Sn containing stabilizers, Ca—Zn containing stabilizers, organic based stabilizer OBS®, Ca-organic bases stabilizers, Ba—Zn containing stabilizers, or combinations thereof.

In one particular embodiment the thermoplastic PVC resin composition comprising the mineral material of the present invention in amounts from 1 phr to 20 phr, further comprises a Ca—Zn containing stabilizer in an amount of 1 phr to 6 phr, preferably from 2 phr to 5 phr, more preferably from 3 phr to 4 phr. In particular embodiment the amount of the Ca—Zn containing stabilizer is 3.5 phr. Such PVC composition being used for producing window profiles.

Ca—Zn containing stabilizers suitable for the present invention are available from a wide variety of suppliers. Such as Stabilox CZ 2913 GN, from Reagens Deutschland GmbH.

Alternatively or in addition the stabilizer may also be selected from organo-tin stabilizers. Such as methyl-tin, reverse ester tins, and tin mercaptides. Such organo-tin stabilizer encompass several classes of compounds. Tin mercaptides comprise blends of dialkyl-tin bis(iso-thioglycolates) with monoalkyl-tin tris(iso-thioglycolates).

Other organo-tin stabilizers which may be added comprise dialkyl-tin carboxylate esters, of which the most common are dialky-tin maleate esters such as dialkly-tin maleate octoate.

If an organo-tin stabilizer is added to the thermoplastic PVC resin, said organo-tin stabilizer is preferably added in amounts of 0.5 phr to about 2 phr.

Additionally or alternatively, further additives such as lubricants, calcium stearate and/or pigments like titanium dioxide may be added, if necessary. Such further additives are preferably present in the thermoplastic PVC resin composition comprising the mineral material of the present invention in amounts of at least 0.1 phr, preferably in amounts from about 0.01 phr to about 9 phr, preferably from about 0.5 phr to about 5 phr.

Lubricants, calcium stearates and/or titanium dioxide suitable for the use in the present invention, e.g. Tyrin 7000, Paraloid KM366, Durastrenght 340, Realube AIS, Realube 3010, Kronos CL2220, Tiona 168, are available from a variety of suppliers such as Baerlocher, Chemson, Ika, Reagens, Akdeniz Kimya, Kronos, DuPont, Huntsman and many more. Useful lubricants, internal as well as external lubricants, are known in the art and can be selected from Table 1.

The content of Table 1 is of mere illustrative character and shall not be construed to be limited to these lubricants.

TABLE 1

| Chemical name | Length of chain | Polar moiety | Lubrication internal | Lubrication external |
|---|---|---|---|---|
| Fatty alcohol | $C_{14}$-$C_{18}$ | —OH | ****** | |
| Dicarboxylic acid ester | $C_{14}$-$C_{18}$ | —COO— | ****** | |
| Fatty acid glycerol ester | $C_{14}$-$C_{18}$ | —COO— | ***** | * |
| Metal soap | $C_{14}$-$C_{18}$ | —COO—Ca | ***** | * |
| Fatty acid glycerol ester | $C_{16}$-$C_{18}$ | —COO— and —OH | ***** | * |
| Fatty acid ester | $C_{14}$-$C_{18}$ | —COO— | **** | ** |
| Fatty acid ester | $C_{16}$-$C_{18}$ | —COO— | **** | ** |
| Ester wax | $C_6$-$C_{18}$ | —COO— | *** | *** |
| Ester wax | $C_{14}$-$C_{18}$ | —COO— | ** | **** |
| Fatty acid amide | $C_{14}$-$C_{18}$ | CO—NH—CO— | ** | **** |
| Metal soap | $C_{18}$ | —COO—Zn | ** | **** |
| Hydroxy fatty acids | $C_{14}$-$C_{18}$ | —COOH and —OH | * | ***** |
| Fatty acid | >$C_{14}$-$C_{18}$ | —COOH | * | ***** |
| Paraffin wax | >$C_{20}$ | Non-polar | | ****** |
| Polyethylene wax | ≈$C_{100}$ | Non-polar | | ****** |

The present invention is now further explained by way of examples and figures, which are not intended to limit the scope of the invention in any way.

EXAMPLES

Measuring Methods

Figure 1A:
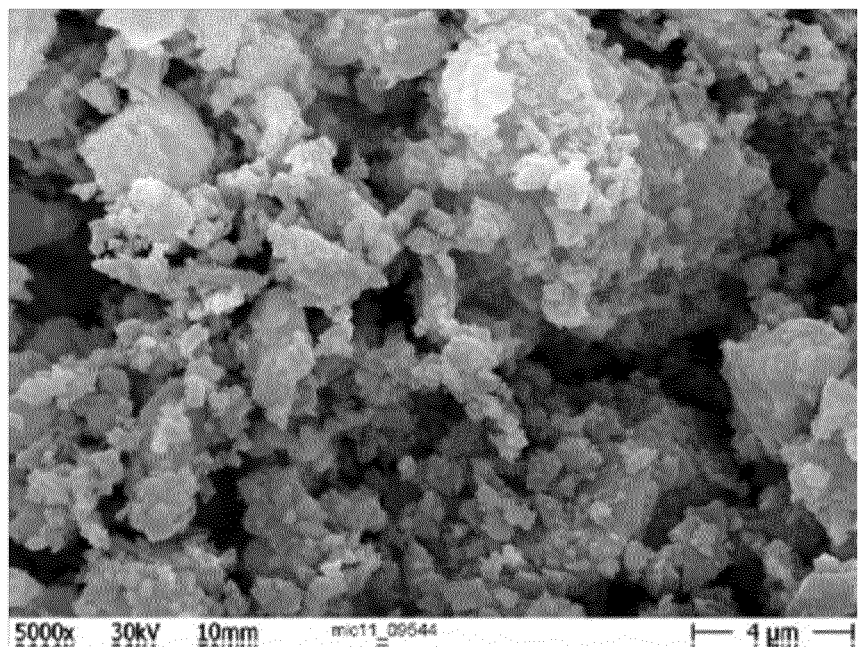
FIG. 1a shows a SEM picture of an untreated $CaCO_3$ obtained by the processes of the prior art. After drying and before de-agglomeration, large agglomerates still are present and thus provide for a less homogeneous dispersion of the $CaCO_3$ in final products.
Figure 1B:
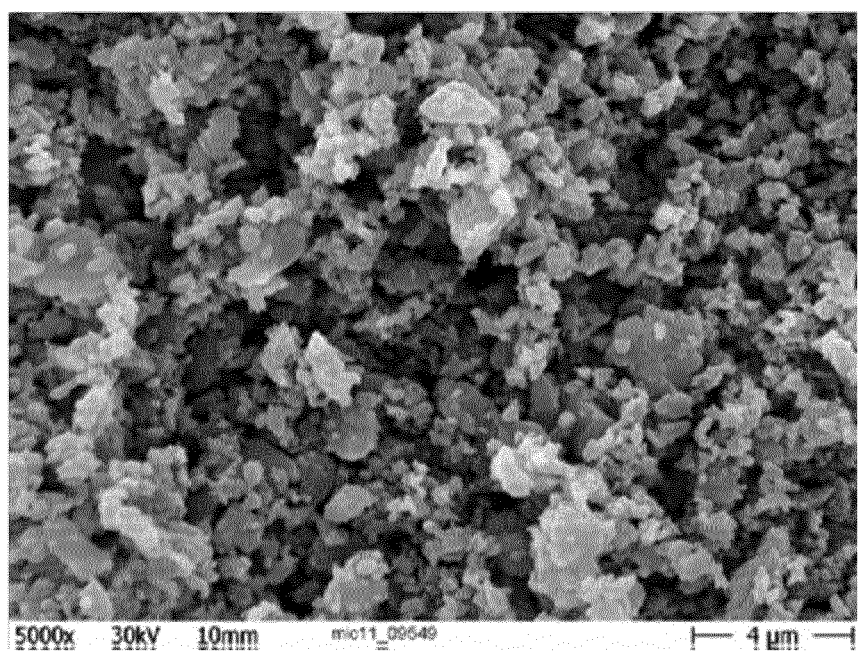
FIG. 1b shows a SEM picture which of an untreated $CaCO_3$ obtained by the process of the present invention. After drying and before de-agglomeration almost no agglomerates are present and thus promote good dispersing ability of the $CaCO_3$ in final products
Figure 2A:
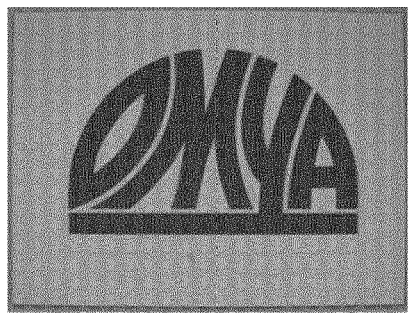
FIG. 2a shows pictures of blown film samples according to table 7, wherein two prior art CaCO3 masterbatches are compared to the masterbatch of the present invention at CaCO3 concentrations of 20 wt % of the whole polymer.
Figure 2A:
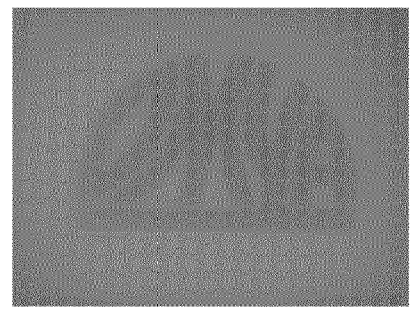
Figure 2A:
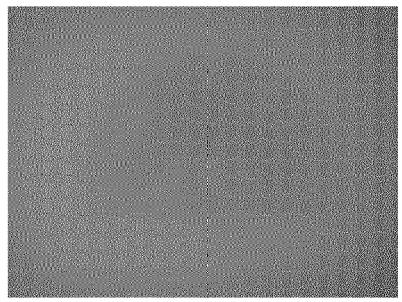
Figure 2A:
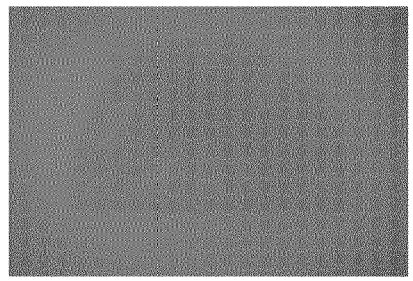
Figure 2B:
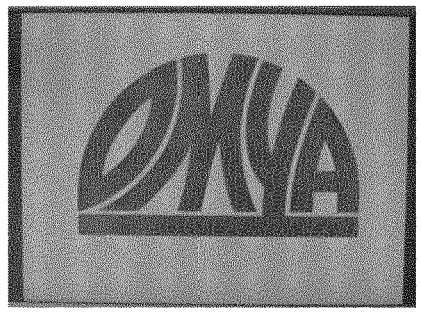
FIG. 2b shows pictures of blown film samples according to table 7, wherein a prior art CaCO3 masterbatch is compared to the masterbatch of the present invention at CaCO3 concentrations of 10 wt % of the whole polymer.
Figure 2B:
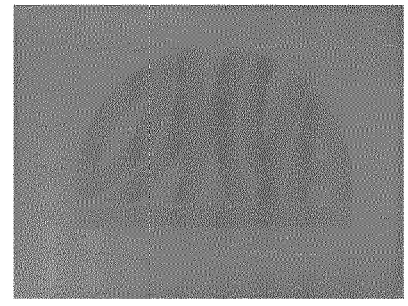
Figure 2B:
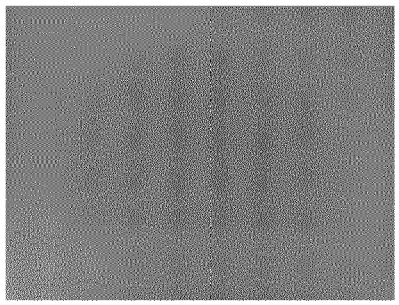

If not otherwise indicated, the parameters mentioned in the present invention are measured according to the measuring methods described below.

Weight Median Particle Diameter $d_{50}$ Value

Throughout the present invention, $d_{50}$ is the weight median particle diameter by weight, i.e. representing the particles in such a manner that 50 wt-% of the particles are coarser or finer.

The weight median particle diameter was measured according to the sedimentation method. The sedimentation method is an analysis of sedimentation behaviour in a gravimetric field. The measurement is made with a Sedigraph™ 5100 from Micromeritics Instrument Corporation. The method and the instrument are known to the skilled person and are commonly used to determine grain size of fillers and pigments routinely. The measurement is carried out in an aqueous solution of 0.1 wt % Na4P2O7. The samples were dispersed using a high speed stirrer and ultrasound.

Specific Surface Area (BET)

The specific surface area was measured using nitrogen and the BET method according to ISO 9277.

Charpy Impact Strength

Charpy notched impact strength was measured according to 179-1:2000 according to conditions 1fC and 1eA on V-notched extruded samples which were cut out of the extrudate in machine direction. Measuring conditions: 23° C.±2° C. and 50%±10% relative humidity. The test specimens were prepared by extrusion as described in ISO 3167 Typ A.

Moisture Content

Moisture content of the inorganic mineral material is determined by thermogravimetric analysis (TGA). TGA analytical methods provide information regarding losses of mass with great accuracy and is common knowledge, and described in "Principles of Instrumental analysis", fifth edition, Skoog, Holler, Nieman, 1998 (first Ed. 1992) in Chapter 31, pages 798-800, and in many other commonly known references known to the skilled person. In the present invention, thermogravimetric analysis was performed using a Mettler Toledo TGA 851 based on a sample of 500 mg±50 mg and a scanning temperature from 105° C. to 400° C. at a rate of 20° C./minute under an air flow of 70 ml/min.

K-Value of PVC: A measure of the molecular weight of PVC based on measurements of viscosity of a PVC solution. It ranges usually between 35 and 80. Low K-values imply low molecular weight (which is easy to process but has inferior properties) and high K-values imply high molecular weight, (which is difficult to process, but has outstanding properties). In general, K-values for a particular PVC resin are provided by the resin producer either on the packaging or the accompanying technical data sheet.

Brookfield™ Viscosities

The viscosities of the mixtures were measured using a Brookfield™ (model DV-II+) viscometer at 30° C. with spindle n° 5, at 10 rpm and 100 rpm.

Surface Gloss

The surface gloss was measured with a Byk Spectro Guide Sphere Gloss at an angle of 60° from the plane surface according to ISO 2813:1994. The gloss value is determined by calculating the average value of n measurement. In the present set up n=10.

Test 1: Preparation and Testing of Samples (in Rigid PVC)

TABLE 2

| | Example | | | | |
|---|---|---|---|---|---|
| | C1 | C1' (6 hr)* | C2 | E1 | E2 |
| PVC K-value 66 (Evipol SH6630) | 100 (phr) | 100 (phr) | 100 (phr) | 100 (phr) | 100 (phr) |
| Ca—Zn containing stabilizer (Stabilox CZ 2913 GN) | 4.3 (phr) | 4.3 (phr) | 4.3 (phr) | 4.3 (phr) | 4.3 (phr) |
| Lubricant: 12-Hydroxy stearic acid (Realube AIS) | 0.2 (phr) | 0.2 (phr) | 0.2 (phr) | 0.2 (phr) | 0.2 (phr) |
| Lubricant: PE wax (Realube 3010) | 0.15 (phr) | 0.15 (phr) | 0.15 (phr) | 0.15 (phr) | 0.15 (phr) |
| Titanium dioxide (Kronos 2220) | 3.5 (phr) | 3.5 (phr) | 3.5 (phr) | 3.5 (phr) | 3.5 (phr) |
| Acrylic impact modifier (Durastrength 340) | 6 (phr) | 6 (phr) | 6 (phr) | 6 (phr) | 6 (phr) |
| Ground natural CaCO$_3$ | 8 (phr) | 8 (phr) | 16 (phr) | 8 (phr) | 16 (phr) |
| BET [m$^2$/g] | 7.9 | 7.9 | 7.9 | 5.9 | 5.9 |
| Median d$_{50}$ [μm] | 0.94 | 0.94 | 0.94 | 0.71 | 0.71 |
| Top Cut d$_{98}$ [μm] | 5 | 5 | 5 | 3 | 3 |
| Charpy impact resistance [kJ/m$^2$] ISO179/1fC | 51 | 47 | 42 | 56 | 55 |
| Gloss 60°[—] | 36 | 34 | 22 | 49 | 36 |
| L*-value | 95.32 | 95.36 | 95.48 | 96.17 | 96.02 |
| a*/b*-value | −0.43/3.43 | −0.42/3.41 | −0.20/3.95 | −0.36/3.64 | −0.25/4.02 |
| Torque [Nm] | 513 | 505 | 482 | 472 | 461 |

(6 hr)* C1' is a reference run after continuous extrusion for 6 hr.

The components for comparative examples C1, C1', C2 as well as inventive examples E1 and E2 in Test 2 were previously mixed using the usual hot/cold mixing process known to the skilled person, and extruded on a Göttfert extrusion line equipped with a Krauss-Maffei plastification unit, L/D 32, with counter rotating parallel twin screws, the screws having a diameter of 30 mm each.

Test 2: Preparation and Testing of Samples

| | Example | | | | |
|---|---|---|---|---|---|
| | C1 | C1' (2 hr)* | C2 | E1 | E2 |
| PVC K-value 65 (Vestolit P 1982 K) | 100 (phr) | 100 (phr) | 100 (phr) | 100 (phr) | 100 (phr) |
| Ca—Zn containing stabilizer from Barlocher | 3.95 (phr) | 3.95 (phr) | 3.95 (phr) | 3.95 (phr) | 3.95 (phr) |
| Calcium stearate | 0.2 (phr) | 0.2 (phr) | 0.2 (phr) | 0.2 (phr) | 0.2 (phr) |
| Lubricant: PE wax (Realube 3010) | 0.15 (phr) | 0.15 (phr) | 0.15 (phr) | 0.15 (phr) | 0.15 (phr) |
| Titanium dioxide (Kronos 2220) | 3.5 (phr) | 3.5 (phr) | 3.5 (phr) | 3.5 (phr) | 3.5 (phr) |
| Ground natural CaCO$_3$ | 8 (phr) | 8 (phr) | 16 (phr) | 8 (phr) | 16 (phr) |
| BET [m$^2$/g] | 7.9 | 7.9 | 7.9 | 5.9 | 5.9 |
| Median d$_{50}$ [μm] | 0.94 | 0.94 | 0.94 | 0.71 | 0.71 |
| Top Cut d$_{98}$ [μm] | 5 | 5 | 5 | 3 | 3 |
| Charpy impact resistance [kJ/m$^2$] ISO179/1eA | 55 | 39 | 49 | 130 | 118 |
| Gloss 60°[—] | 42 | 43 | 27 | 56 | 47 |
| L*-value | 95.23 | 95.22 | 96.17 | 96.82 | 95.99 |
| a*/b*-value | −0.40/3.38 | −0.42/3.25 | −0.52/3.70 | −0.39/3.09 | −0.24/3.86 |
| Torque [Nm] | 515 | 520 | 511 | 490 | 475 |

(2 hr)* C1' is a reference run after continuous extrusion for 2 hr.

The components for comparative examples C1, C1', C2 as well as inventive examples E1 and E2 in Test 1 were previously mixed using the usual hot/cold mixing process known to the skilled person, and extruded on a Krauss-Maffei KMD 2-90 profile extrusion line, L/D 22, with counter rotating parallel twin screws, the screws having a diameter of 90 mm each.

The CaCO$_3$ of comparative examples C1, C1' and C2, is a prior art CaCO$_3$ having the following characteristics. The CaCO$_3$ is of natural origin. The BET surface area is 7.9 m$^2$/g with a mean particle diameter d$_{50}$ of 0.94 μm. The CaCO$_3$ was prepared according to grinding methods known to the skilled person and as described in U.S. Pat. Nos. 5,533,678 or 5,873,935 with the use of dispersing agents during the wet grinding process and treated with 1 wt % of an industrial fatty acid mixture of C$_{18}$/C$_{16}$ in amounts of 50 wt %/50 wt %. Such industrial fatty acid mixtures can vary in their $C_{18}/C_{16}$ amount from about 30 wt %-70 wt %/70 wt %-30 wt %, as well as in their carbon chain length being from $C_{14}$ to $C_{20}$.

The $CaCO_3$ of the inventive examples E1 and E2 have been prepared according to the process of the present invention, thus without relevant processing aids during wet grinding, and with a surface treatment after drying with 1 wt % of an industrial fatty acid mixture of $C_{18}/C_{16}$ in amounts of 50 wt %/50 wt %.

Test 1

E1 provides for a 10% increase in charpy impact resistance (ISO 179/1fC) with same amount (8 phr) of $CaCO_3$ of the present invention as the comparative example C1. With higher amount E2 (16 phr) of the $CaCO_3$ of the present invention the charpy impact strength (ISO 179/1fC) on an extruded profile is still about 10% higher than the charpy impact strength of C1 or C1' and even 20% than comparative example C2 with same amounts of $CaCO_3$ of 16 phr. A further change can be observed in the torque of the extruder, which is affected positively, as the Torque is decreasing with increasing $CaCO_3$ content provided according to the present invention. Lower torque means lower energy consumption in first place but also less stress imposed on the polymer matrix during extrusion.

Gloss 60° [-] of E1 (8 phr), and E2 (16 phr) is significantly improved over comparative examples C1 (8 phr) and C2 (16 phr) by about 35% at 8 phr and by about 60% at 16 phr. Further optical properties such as brightness—see L*—value, are not affected to the negative and red—/yellowness—values—see a*/b*—values, remain within the tolerances and thus the overall benefit provided by the present invention is shown. Noteworthy that a thermoplastic PVC resin comprising a mineral filler of the present invention has improved gloss and Charpy impact strength as well as a better processability as lower torque is needed when made into a final product such as window profile.

Test 2

E1 provides for an increase in the Charpy impact resistance (ISO179/1eA) by about 100%, with same amount (8 phr) of $CaCO_3$ of the present invention as the comparative example C1. With higher amount (16 phr) of the $CaCO_3$ of the present invention the Charpy impact strength (ISO179/1eA) on an extruded profile is still over 100% higher than the Charpy impact strength of C1, C1' and C2. A further change can be observed in the torque of the extruder, which is affected positively, as the Torque is decreasing with increasing $CaCO_3$ content provided according to the present invention. Lower torque means lower energy consumption in first place but also less stress imposed on the polymer matrix during extrusion. Finally optical properties such as gloss or yellowness are within the tolerances and thus the overall benefit provided by the present invention is show, noteworthy the replacement of at least 8 phr of a PVC polymer by a filler without negatively affecting physical and optical properties.

Gloss 60° [-] of E1 (8 phr), and E2 (16 phr) is significantly improved over comparative examples C1 (8 phr) and C2 (16 phr) by about 30% at 8 phr and by about 10% at 16 phr. Further optical properties such as brightness—see L*—value, are not affected to the negative and red-/yellowness—values—see a*/b*—values, remain within the tolerances and thus the overall benefit provided by the present invention is shown. Noteworthy that a thermoplastic PVC resin comprising a mineral filler of the present invention has improved gloss and Charpy impact strength as well as a better processability as lower torque is needed when made into a final product such as window profile.

The thermoplastic PVC polymer product comprising the thermoplastic PVC resin composition comprising the mineral material of the present invention in amounts from 1 phr to 20 phr, preferably from about 5 phr to about 19 phr, still more preferably from about 6 phr to about 18 phr, and still more preferably from about 7 phr to about 17 phr, and further comprising additives such as stabilizers, impact modifiers, lubricating agents, processing aids, pigments and combinations thereof in amounts as previously described has a charpy impact strength at 23° C. of from 80 kJ/m² to 150 kJ/m², preferably from 100 kJ/m² to 140 kJ/m² measured according to ISO 179/1eA on extruded samples.

The thermoplastic PVC polymer product comprising the thermoplastic PVC resin composition comprising the mineral material of the present invention in amounts from 1 phr to 20 phr, preferably from about 5 phr to about 19 phr, still more preferably from about 6 phr to about 18 phr, and still more preferably from about 7 phr to about 17 phr, and further comprising additives such as stabilizers, impact modifiers, lubricating agents, processing aids, pigments and combinations thereof in amounts as previously described has a Charpy impact strength at 23° C. of from 50 kJ/m² to 80 kJ/m², preferably from 50 kJ/m² to 70 kJ/m² measured according to ISO 179/1fC on extruded samples.

The term "charpy impact strength" within the meaning of the present invention refers to the kinetic energy per unit area required to break a test specimen under flexural impact. Test specimen is held as a simply supported beam and is impacted by a swinging pendulum. The energy lost by the pendulum is equated with the energy absorbed by the test specimen.

Further embodiments comprising the mineral matter according to the present invention are now presented.

Use in Unsaturated Polyester Resins

The mineral material of the present invention is made into unsaturated polyester resins in order to provide for a sheet moulding compound (SMC) or bulk moulding compound (BMC) which is a mould fibre-reinforced polyester material primarily used in compression moulding. The manufacturing of SMCs require in general two steps. The first step consists of providing for a thermoset resin, the second step (conversion operation), known as SMC compression, is the moulding in a hot press. During said conversion operation the combined action of increased temperature and mechanical pressure allows the filling of the mould with the SMC and the crosslinking of the thermoset resin.

An unsaturated polyester resins comprising chopped glass fibres with 2-3 cm length and around 100 μm in diameter is mixed with the mineral material of the present invention, to provide for a sheet like, ductile, non-sticky SMC. The quality of the filled thermoset resin mainly depends on the contact between the glass fibres and the filled unsaturated polyester resin, which is strongly affected by the rheology of the composition, and therefore depending on a good dispersing ability of the mineral filler of the present invention.

Said mineral material according to the present invention, is preferably an untreated $CaCO_3$ with a median particle size diameter of about 0.1 μm to about 1.5 μm, preferably from about 0.4 μm to about 1.1 μm, more preferably from about 0.6 μm to about 0.9 μm, and most preferably of 0.8 μm, and wherein the BET/$N_2$ specific surface area is measured on the untreated mineral material and amounts from 3 m²/g to 13 m²/g, preferably from 6 m²/g to 10 m²/g, more preferably from 7 m²/g to 8 m²/g.

The mineral material according to the present invention has a top cut $d_{98}$ equal or below 6 μm, such as from about 5.9 μm to about 1.8 μm, preferably from about 5 μm to about 1.8 μm, more preferably from about 4 μm to about 2.5 μm The amount of the $CaCO_3$ according to the present invention used is from about 10 wt % to about 75 wt %, preferably from about 15 wt % to about 60 wt %, more preferably from about 20 wt % to about 50 wt %. The amount of glass fibres is comprised from about 5 wt % to about 45 wt %, preferably from about 10 wt % to about 40 wt %, more preferably from about 15 wt % to about 35 wt %. The unsaturated polyester resin amounts from about 5 wt % to about 35 wt %, preferably from about 10 wt % to about 30 wt %, more preferably from about 10 wt % to about 20 wt %.

The SMC may further comprise other compounds in usual amounts such as additives to prevent shrinkage, flame retardants, crosslinking promoters such as peroxides, colorants, pigments, electro conducting materials and many more.

According to one embodiment, 75 kg of an unsaturated polyester resin (Palapreg P18-03, from DSM), 50 kg of low profile additive (Parapleg H 852-03, from DSM) and 250 kg of an untreated $CaCO_3$ according to the present invention were mixed, wherein the $CaCO_3$ had a mean particle size $d_{50}$ of 1.5 μm, a top cut $d_{98}$ of 6 μm and BET specific surface area of 3.8 $m^2/g$. Brookfield™ viscosities of the formulation were measured after 2 hrs at 30° C., at 10 rpm (revolutions per minute) and 100 rpm, using spindle no 5, and are summarized in Table 3.

TABLE 3

| | Brookfield viscosity at 10 rpm, 30° C. (mPa · s) | Brookfield viscosity at 100 rpm, 30° C. (mPa · s) |
|---|---|---|
| Brookfield viscosities (spindle n°5) of the formulation after 2 hrs | 31'120 | 14'500 |

Brookfield™ viscosities of the filled unsaturated polyester resin, comprising the $CaCO_3$ of the present invention, showed a very good quality of the paste resulting in a good wetting effect of the glass fibers by the unsaturated polyester paste. The SMC and BMC obtained after molding with said glass fiber filled unsaturated polyester resin provided for a high surface quality and good mechanical properties.

Use in Flexible Polyurethane Foam

The mineral material of the present invention is made into flexible polyurethane foam.

In general polyurethane foams are prepared by methods comprising the steps of reacting a polyol with an isocyanate in the presence of water to form a flexible polyurethane foam. The polyol include polyether polyols, obtained, for example by adding propylene oxide or ethylene oxide to glycerine, trimethlyolpropane or diethylene glycol, although the type of the base polyol is not critical. The polyol preferably has a on OH value of 10 to 100, preferably from 20 to 80, more preferably from 30 to 55.

In order to get a good dispersed mineral material according to the present invention in the flexible polyurethane foam, the mineral material of the present invention is introduced into the polyol matrix, prior to mixing with the other components.

The mineral material to be used in the above mentioned process can be any natural or synthetic calcium carbonate or calcium carbonate comprising material selected from the group comprising marble, chalk, dolomite, calcite, limestone, magnesium hydroxide, talc, gypsum, titanium oxide or mixtures thereof.

Said mineral material according to the present invention, is preferably an untreated $CaCO_3$ with a median particle size diameter of about 0.1 μm to about 1.5 μm, preferably from about 0.4 μm to about 1.1 μm, more preferably from about 0.6 μm to about 0.9 μm, and most preferably of 0.8 μm, and wherein the $BET/N_2$ specific surface area is measured on the untreated mineral material and amounts from 3 $m^2/g$ to 13 $m^2/g$, preferably from 4 $m^2/g$ to 12 $m^2/g$, more preferably from 5 $m^2/g$ to 10 $m^2/g$, still more preferably from 6 $m^2/g$ to 9 $m^2/g$, and still more preferably from 7 $m^2/g$ to 8 $m^2/g$. Said untreated mineral material obtained by the process of the present invention has a top cut $d_{98}$ equal or below 6 μm, such as from about 5.9 μm to about 1.8 μm, preferably from about 5 μm to about 1.8 μm, more preferably from about 4 μm to about 2.5 μm.

The amount of the $CaCO_3$ according to the present invention used is from about 10 wt % to about 75 wt %, preferably from about 15 wt % to about 60 wt %, more preferably from about 20 wt % to about 45 wt %.

According to one embodiment, flexible polyurethane foam was prepared by mixing the components as presented in Table 4.

TABLE 4

| | Unit | Formulation |
|---|---|---|
| Polyol I OH = 48 | parts | 100 |
| $CaCO_3$ according to the present invention | % of polyol | 10 |
| Triethylene diamine diluted at 33% (w/w) in dipropylene glycol | % of polyol | 0.15 |
| Stannous octoate | % of polyol | 0.22 |
| Tegostab BF 2370 from Evonik | % of polyol | 0.8 |
| Water | % of polyol | 4.6 |
| Toluene diisocyante (TDI) 80% | % of polyol | 56.2 |
| Isocyanate index | % | 108 |
| Cream time | s | 18.1 |
| Rise time | s | 96 |

The preparation of the flexible polyurethane foam was made according to the following procedure:

In a sealable glass bottle of 220 ml, toluene di-isocyanate (TDI) was weighed after storage for a minimum of 6 hours at room temperature. After weighing, the bottle was closed and stored at room temperature.

In a polyethylene bottle of 800 ml, the following ingredients were weighed in order of citation: the surfactant, polyol, water, amine catalyst, the tin-based catalyst. It should be noted that all these reagents were stored at room temperature at least 6 hours before handling.

The polyethylene bottle was stirred with a mixer GRENIER-CHARVET equipped with a high shear disk. Stirring was carried out at a speed sufficient to create a vortex.

The TDI previously prepared in the glass bottle was then emptied completely in the polyethylene bottle and a stopwatch was put into operation simultaneously (the t=0 of the experiment). After 20 seconds of intensive mixing of the reaction medium, the content of the polyethylene bottle was put promptly and fully into a paper box with a form of cube (side 20 cm). The cream time of the beginning of the expansion was measured and the corresponding rise time at the end of the expansion of the flexible polyurethane foam.

After the end of the rise, the polyurethane foam sample thus prepared was introduced into a ventilated oven at 100° C. for 15 minutes. At the end of the curing, the polyurethane foam sample was stored for at least 24 hours before being cut for the measurement of different physico-chemical and mechanical properties.

The values given in table 5 are the average of measurements on five samples of flexible polyurethane foam.

The tests were performed to obtain between 300 and 500 g of polyurethane foam. When the calcium carbonate was introduced in the composition of the foam, it has been incorporated into the polyethylene bottle after the polyol and before the water. Before the introduction into the composition the $CaCO_3$ of the present invention was dispersed in a part of the polyol used in the composition. The concentration of the calcium carbonate in the polyol was between 40 and 50% by weight.

The $CaCO_3$ of the present invention used in this example had a mean particle size $d_{50}$=1.4 µm, a top cut $d_{98}$ equal to 5 µm and a BET specific surface area equal to 5 $m^2$/g.

The viscosity of the dispersion (45 wt % of $CaCO_3$) was measured with a Brookfield™ viscometer at 23° C. and was equal to 3800 mPa·s.

TABLE 5

| | |
|---|---|
| Density (kg/$m^3$) | 26 |
| Compression to 40% (NFT 56-110) (N/$dm^2$) | 50 |
| Compression to 50% (NFT 56-110) (N/$dm^2$) | 56.8 |
| Tear resistance (NFT 56-109) (N/m) | 767 |
| Tensile strength (NFT 56-108) (N/$mm^2$) | 0.098 |
| Elongation at break (NFT 56-108) (%) | 139 |

Use in LLDPE Masterbatch

The mineral material of the present invention is made into a masterbatch of a polyolefin. In particular the mineral material of the present invention in treated form is compounded into a linear low density polyethylene (LLDPE). The LLDPE is present in amounts of about 10 wt % to about 80 wt % and the treated mineral material of the present invention is present in amounts of about 90 wt % to about 20 wt %. Preferably the LLDPE is present in amount of 20 wt % to about 50 wt % and the treated mineral material according to the present invention is present in amounts of 80 wt % to about 50 wt %. More preferably the LLDPE is present in amounts of 25 wt % to about 45 wt % and the treated mineral material according to the present invention is present in amounts of 85 wt % to about 60 wt %, most preferably the masterbatch is composed of 30 wt % to 40 wt % of the LLDPE and of 70 wt % to about 60 wt % of the treated mineral material according to the present invention, and wherein the median particle diameter $d_{50}$ was determined on the untreated mineral material and has a value from about 0.1 µm to about 1.5 µm, preferably from about 0.4 µm to about 1.1 µm, more preferably from about 0.6 µm to about 0.9 µm, and most preferably of 0.8 µm, and wherein the BET/$N_2$ specific surface area is measured on the untreated mineral material and amounts from 3 $m^2$/g to 13 $m^2$/g, preferably from 6 $m^2$/g to 10 $m^2$/g, more preferably from 7 $m^2$/g to 8 $m^2$/g.

The mineral material can be any natural or synthetic calcium carbonate or calcium carbonate comprising material selected from the group comprising marble, chalk, dolomite, calcite, limestone, magnesium hydroxide, talc, gypsum, titanium oxide or mixtures thereof.

A filter pressure test was performed in order to determine the filter pressure value FPV of a LLDPE masterbatch as described above and compared to the FPV a masterbatch comprising a mineral material of the prior art. An example of a masterbatch is given in Table 6, wherein 30 wt % of an LLDPE was used as carrier resin.

The filter pressure test as herein described provides for the Filter Pressure Value, in the present case, of dispersed mineral material in a LLDPE. The Filter Pressure Value FPV is defined as the increase of pressure per gram filler. This test is performed to determine the dispersion quality and/or presence of excessively coarse particles or agglomerates of mineral materials in a masterbatch. Low Filter Pressure Values refers to a good dispersion and fine material, wherein high Filter Pressure Values refer to bad dispersion and coarse or agglomerated material.

The Filter Pressure test was performed on a commercially available Collin Pressure Filter Test, Teach-Line FT-E20T-IS, according to the standard EN 13900-5. Filter type used was 14 µm and 25 µm, extrusion was carried out at 200° C.

The masterbatch which was tested was composed of 30 wt % of a LLDPE from Dow (Dowlex 2035 G), with a density of 0.919 g/$cm^3$, and a $MFR_{2.16}$ at 190° C. was 6.0 g/10 min, and 70 wt % of treated $CaCO_3$ from the prior art or treated $CaCO_3$ made according to the process of the present invention.

TABLE 6

Masterbatch: LLDPE Dowlex 2035G at 30 wt % + 70 wt % of $CaCO_3$

| | Filterpressure Test | Filterpressure Test | |
|---|---|---|---|
| Pore size filter | 14 µm | 25 µm | |
| 70 wt % $CaCO_3$ treated (invention) | 0.68 | n/a | bar/g |
| 70 wt % $CaCO_3$ treated (prior art 1) | 2.50 | n/a | bar/g |
| 70 wt % $CaCO_3$ treated (prior art 2) | 6.69 | 1.07 | bar/g |
| 70 wt % $CaCO_3$ treated (prior art 3) | 7.34 | 1.77 | bar/g |

The $CaCO_3$ according to the present invention clearly shows its beneficial properties over the $CaCO_3$ of the prior art 1-3 when made into a masterbatch. The pressure on the pore filter at 14 µm shows that the $CaCO_3$ of the prior art causes clogging of the filter due to bad dispersed and/or coarse $CaCO_3$ particles, whereas the $CaCO_3$ according to the present invention, causes no clogging and thus also no significant pressure build up at the pore size filter, thus nicely demonstrating the advantageous properties, the improved dispersion of the $CaCO_3$ particles in the polymer matrix.

Further to this, said filled LLDPE masterbatches were made into blown film by means known to the skilled person. Samples of the said blown films comprising the $CaCO_3$ according to the present invention and samples of blown films comprising the prior art $CaCO_3$ are compared hereafter in table 7. Different amounts of filled masterbatch were mixed with a further LLDPE (Dowlex 5056G) and blown films were made from these mixtures.

TABLE 7

| | Aquatrac | | Formulation of examples | | | | | | |
|---|---|---|---|---|---|---|---|---|---|
| | ppm | g/cm³ | 1 | 2 | 3 | 4 | 5 | 6 | 7 |
| LLDPE Dowlex 5056G | | 0.919 | 100.0 | 85.7 | 71.4 | 85.7 | 71.4 | 66.7 | 71.4 |
| 70% MB Invention | 484 | 1.730 | | 14.3 | 28.6 | | | | |
| 70% MB PA1 | 460 | 1.730 | | | | 14.3 | 28.6 | | |
| 60% MB Invention | | 1.540 | | | | | | 33.3 | |
| 70% MB PA2 | 618 | 1.730 | | | | | | | 28.6 |
| Weight of the mixture | | kg | 100.0 | 100.0 | 100.0 | 100.0 | 100.0 | 100.0 | 100.0 |
| Density of the mixture | | g/cm³ | 0.92 | 0.99 | 1.06 | 0.99 | 1.06 | 1.06 | 1.06 |
| Universal tests | | | | | | | | | |
| Tensile strength at yield, MD[1] | ISO 527 | N/mm² | 10.3 | 10.4 | 10.4 | 10.3 | 10.2 | 10.7 | 10.0 |
| Tensile strength at yield, CD[2] | ISO 527 | N/mm² | 9.4 | 9.3 | 9.7 | 9.9 | 8.9 | 10.3 | 9.8 |
| Elongation at yield, MD[1] | ISO 527 | % | 13.7 | 9.8 | 9.2 | 11.1 | 8.6 | 9.2 | 9.9 |
| Elongation at yield, CD[2] | ISO 527 | % | 9.5 | 8.0 | 6.9 | 8.1 | 6.5 | 6.8 | 7.4 |
| Tensile strength at break, MD[1] | ISO 527 | N/mm² | 60.3 | 53.7 | 45.3 | 44.4 | 38.0 | 36.5 | 31.7 |
| Tensile strength at break, CD[2] | ISO 527 | N/mm² | 55.1 | 45.1 | 35.7 | 33.2 | 29.5 | 35.2 | 25.1 |
| Elongation at break, MD[1] | ISO 527 | % | 561 | 514 | 509 | 502 | 487 | 507 | 448 |
| Elongation at break, CD[2] | ISO 527 | % | 609 | 581 | 558 | 519 | 526 | 570 | 488 |
| Elmendorf tear propagation resistance, MD[1] | ISO 6383/2 | cN | 287 | 298 | 362 | 328 | 391 | 461 | 393 |
| Elmendorf tear propagation resistance, CD[2] | ISO 6383/2 | cN | 406 | 397 | 522 | 453 | 522 | 564 | 531 |
| E-modulus, MD[1] | ISO 527 | N/mm² | 246 | 280 | 299 | 282 | 317 | 314 | 298 |
| E-modulus, CD[2] | ISO 527 | N/mm² | 246 | 270 | 304 | 297 | 315 | 347 | 316 |
| Opacity | | | 13.4 | 16.6 | 20.9 | 15.7 | 18.7 | 20.6 | 18.4 |
| Dart drop impact | | grams | 441 | 609 | 561 | 453 | 348 | 621 | 219 |
| Thickness, MD[1] | | μm | 23 | 20 | 21 | 24 | 23 | 23 | 24 |
| Thickness, CD[2] | | μm | 22 | 21 | 22 | 22 | 22 | 22 | 23 |

[1]MD refers to machine direction,
[2]CD refers to cross direction.

70% MB Invention refer to 70 wt % of a masterbatch of 30 wt % LLDPE Dowlex 2035G and 70 wt % of CaCO3 according to the present invention, wherein the treated CaCO₃ has a median particles size diameter $d_{50}$ of 0.8 μm, a top cut of $d_{98}$ of 3 μm, and a BET specific surface area of 6 m²/g.

70% of MA PA1 refers to 70 wt % of a masterbatch of 30 wt % LLDPE Dowlex 2035 and 70 wt % of a ground surface treated CaCO₃ of the prior art, comprising an acrylic dispersing agent, wherein the surface treating agent is stearic acid, and the CaCO₃ has a median particle size diameter $d_{50}$ of 1.6 μm and a top cut of $d_{98}$ of 6 μm.

70% MA PA2 refers to 70 wt % of a masterbatch of 30 wt % LLDPE Dowlex 2035 and 70 wt % of a ground surface treated CaCO₃ of the prior art, comprising an acrylic dispersing agent, wherein the surface treating agent is stearic acid, and the CaCO₃ has a median particle size diameter $d_{50}$ of 0.8 μm and a top cut of $d_{98}$ of 5 μm, and a BET specific surface area of 10 m²/g.

As can be seen from the inventive examples 2, 3 and 6 from table 7, the tensile strength at break as well as the dart drop impact are significantly improved, while at the same time the film thickness reduced, compared to the comparative examples of the prior art 4, 5 and 7. Example 1 being the unfilled LLDPE Dowlex 5056G.

It lies within the scope of the present invention that the LLDPE mentioned are not the only one and that other LLDPE polymers are suitable as well to be used for producing a masterbatch comprising the CaCO₃ of the present invention.

Therefore, the masterbatch comprising the CaCO₃ of the present invention can be used not only in blown films, but also in the extrusion of pipes, tubes, or hoses, in sheet extrusion, in cast film for subsequent thermoforming, and other processed known to the skilled person.

Use in PP Masterbatch

Still another embodiment of the mineral matter according to the present invention is now presented. The mineral material of the present invention is made into a master-batch of a polyolefine. In particular the mineral material of the present invention in treated form is compounded into a polypropylene (PP). The PP is present in amounts of about 10 wt % to about 80 wt % and the treated mineral material of the present invention is present in amounts of about 90 wt % to about 20 wt %. Preferably the PP is present in amount of 20 wt % to about 50 wt % and the treated mineral material according to the present invention is present in amounts of 80 wt % to about 50 wt %. More preferably the PP is present in amounts of 25 wt % to about 45 wt % and the treated mineral material according to the present invention is present in amounts of 85 wt % to about 60 wt %, most preferably the masterbatch is composed of 30 wt % to 40 wt % of the PP and of 70 wt % to about 60 wt % of the treated mineral material according to the present invention, and wherein the median particle diameter $d_{50}$ was determined on the untreated mineral material and has a value from about 0.1 µm to about 1.5 µm, preferably from about 0.4 µm to about 1.1 µm, more preferably from about 0.6 µm to about 0.9 µm, and most preferably of 0.8 µm, and wherein the BET/N2 specific surface area is measured on the untreated mineral material and amounts from 4 m2/g to 15 m2/g, preferably from 6 m2/g to 10 m2/g, more preferably from 7 m2/g to 8 m2/g.

Suitable PP materials are commercial products including, but are not limited to: PPH 9099 homopolymer polypropylene having a melt flow rate of 25 g/10 min, available from Total Petrochemicals; PPH 10099 homopolymer polypropylene having a melt flow rate of 35 g/10 min, available from Total Petrochemicals; Lumicene MR 2001 homopolymer polypropylene having a melt flow rate of 25 g/10 min, available from Total Petrochemicals; Moplen HP462R polypropylene having a melt flow rate of 25 g/10 min, available from LyondellBasell; Moplen HP561R polypropylene having a melt flow rate of 34 g/10 min, available from LyondellBasell; HG455FB homopolymer polypropylene having a melt flow rate of 27 g/10 min, available from Borealis.

The mineral material can be any natural or synthetic calcium carbonate or calcium carbonate comprising material selected from the group comprising marble, chalk, dolomite, calcite, limestone, magnesium hydroxide, talc, gypsum, titanium oxide or mixtures thereof.

A filter pressure test was performed in order to determine the filter pressure value FPV of a PP masterbatch as described above and compared to the FPV a master-batch comprising a mineral material of the prior art.

The filter pressure test as herein described provides for the Filter Pressure Value, in the present case, of dispersed mineral material, tested with Borealis HF 136 MO, a polypropylene homopolymer with a MFR of 20 g/10 min. The Filter Pressure Value FPV is defined as the increase of pressure per gram filler. This test is performed to determine the dispersion quality and/or presence of excessively coarse particles or agglomerates of mineral materials in a masterbatch. Low Filter Pressure Values refers to a good dispersion and fine material, wherein high Filter Pressure Values refer to bad dispersion and coarse or agglomerated material.

The Filter Pressure test was performed on a commercially available Collin Pressure Filter Test, Teach-Line FT-E20T-IS, according to the standard EN 13900-5. Filter type used was 14 µm; extrusion was carried out at 230° C.

The masterbatch which was tested was composed of 25 wt % of a PP, with a MFR 2.16 at 230° C. of 25 g/10 min.

Further to this, said filled PP masterbatches were used by melt extrusion processes to form fiber and filaments and continuous filament nonwoven fabrics by means known to the skilled person.

In accordance with known technology such as the continuous filament spinning for yarn or staple fiber, and nonwoven processes such as spunbond production and meltblown production, the fibers and filaments are formed by extrusion of the molten polymer through small orifices. In general, the fibers or filaments thus formed are then drawn or elongated to induce molecular orientation and affect crystallinity, resulting in a reduction in diameter and an improvement in physical properties.

Spunmelt is a generic term describing the manufacturing of nonwoven webs (fabrics) directly from thermoplastic polymers. It encompasses 2 processes (spunlaid and meltblown) and the combination of both.

In this process polymer granules are melted and molten polymer is extruded through a spinneret assembly which creates a plurality of continuous polymeric filaments.

The filaments are then quenched and drawn, and collected to form a nonwoven web. Some remaining temperature can cause filaments to adhere to one another, but this cannot be regarded as the principal method of bonding. There are several methods available for forming the collected web of continuous filaments into a useful product by a bonding step, which includes, but is not be limited to calendaring, hydroentangling, needling and/or bonding by means of chemicals or adhesives.

The spunlaid process (also known as spunbonded) has the advantage of giving nonwovens greater strength. Co-extrusion of second components is used in several spunlaid processes, usually to provide extra properties or bonding capabilities.

In meltblown web formation, low viscosity polymers are extruded into a high velocity airstream on leaving the spinneret. This scatters the melt, solidifies it and breaks it up into a fibrous web.

It is known to those skilled in the art to combine processes or the fabrics from different processes to produce composite fabrics which possess certain desirable characteristics. Examples of this are combining spunbond and meltblown to produce a laminate fabric that is best known as SMS, meant to represent two outer layers of spunbond fabric and an inner layer of meltblown fabric. Additionally either or both of these processes may be combined in any arrangement with a staple fiber carding process or bonded fabrics resulting from a nonwoven staple fiber carding process. In such described laminate fabrics, the layers are generally at least partially consolidated by one of the bonding steps listed above.

Processes are well known in the art, and are commercially available, for producing spunbond fabric of polypropylene polymeric resin. The two typical processes are known as the Lurgi process and the Reifenhä user process.

The Lurgi process is based on the extrusion of molten polymer through spinneret orifices followed by the newly formed extruded filaments being quenched with air and drawn by suction through Venturi tubes. Subsequent to formation, the filaments are disbursed on a conveyor belt to form a nonwoven web.

The Reifenhä user process differs from the Lurgi process in that the quenching area for the filaments is sealed, and the quenched air stream is accelerated, thus inducing more effective entrainment of the filaments into the air stream.

In the above-described systems, nonwoven fabrics are generally produced using polypropylene resins having a melt flow index of about 25 to 40 grams/10 minutes. A Lurgi line was used to produce polypropylene nonwovens. Extruder temperatures are between 230° and 250° C. The four spin beams are equipped with melt pumps and spinnerets which contain 600 orifices each with a diameter of 0.8 millimeters. The extruded filaments are formed to a nonwoven web. The conveyor belt speed was adjusted to 20 meters/minute and hydroentangling was used to bond the nonwoven web. Hydroentangling, also known as spunlacing, is a process which employs high pressure water jets to entangle fibers in a loose web thereby creating a fabric held together by frictional forces between the said fibers. The final bonded nonwoven web with a width of 100 cm has a fabric weight of 385 g/m².

Samples of the said nonwoven fabrics comprising the $CaCO_3$ according to the present invention and samples of nonwoven fabrics comprising the prior art $CaCO_3$ are compared hereafter in tables 8 and 9. Different amounts of the filled master-batches were mixed with further polypropylene (PP HF420FB, a homo-polypropylene with MFR 19 g/10 min. (230° C., 2.16 kg, ISO 1133) from Borealis) and nonwoven fabrics were made from these mixtures.

Measuring Methods

If not otherwise indicated, the parameters mentioned in the present invention are measured according to the measuring methods described below.

Measurements Done on Filament Samples

Titer or Linear density [dtex] may be measured according to EN ISO 2062 and corresponds to the weight in grams of 10,000 m yarn. A sample of 25 or 100 meters is wound up on a standard reel under a pretension of 0.5 cN/tex and weighted on an analytical scale. The grams per 10,000 m yarn length are then calculated.

Tenacity is calculated from the breaking force and the linear density, and expressed in centinewton per tex [cN/tex]. The test is carried out on a dynamometer with a constant stretching speed, applicable standards for this test are EN ISO 5079 and ASTM D 3822.

Breaking Force and Elongation at Break: The breaking force is the force needed to be applied on a yarn to make it break. It is expressed in Newton [N]. The elongation at break is the increase of the length produced by stretching a yarn to its breaking point. It is expressed as a percentage [%] of its initial length. Tensile index is the product of tenacity [cN/tex] and the square root of the elongation at break [%].

Measurements Done on Nonwoven Samples

Fabric weight or mass per unit area [g/m²] is measured according to EN ISO 9864. Tensile properties of geotextiles are measured according to EN ISO 10319 using a wide-width strip with 200 mm width and 100 mm length on a tensile testing machine. Tensile strength [kN/m] and the elongation at maximum load [%] are measured in machine direction (MD) and in cross machine direction (CD). The energy value according to EN ISO 10319 is calculated by the tensile strength (MD+CD)/2.

Static puncture resistance (CBR test) in [kN] is measured according to EN ISO 12236. This method specifies the determination of the puncture resistance by measuring the force required to push a flat-ended plunger through geosynthetics.

TABLE 8

| Formulation | | | 1 | 2 | 3 | 4 | 5 |
|---|---|---|---|---|---|---|---|
| Polypropylene HF420FB | | | 100 | 96 | 96 | 96 | 96 |
| 70% MB Invention 1 | | | | 4 | | | |
| 70% MB PA1 | | | | | 4 | | |
| 70% MB Invention2 | | | | | | 4 | |
| 70% MB PA2 | | | | | | | 4 |
| Tests | Norm | Unit | | | | | |
| | | On Filaments | | | | | |
| Linear density | | dtex | 8.46 | 8.64 | 9.3 | 8.59 | |
| Tenacity | | cN/tex | 26.9 | 26.0 | 24.2 | 24.3 | |
| Elongation | | % | 217 | 211 | 206 | 207 | |
| Tensile index | | — | 395 | 377 | 347 | 349 | |
| | | On Nonwoven | | | | | |
| Fabric weight | EN ISO 9864 | g/m² | 379 | 387 | 396 | 393 | |
| Coefficient CBR | EN ISO12236 | N/g | 8.4 | 8.3 | 7.7 | 8.0 | |
| Tensile Strength (MD + CD)/2 | EN ISO 12319 | N/g | 11.2 | 10.9 | 10.6 | 11.0 | |
| Elongation MD [1] | EN ISO 12319 | % | 77 | 78 | 76 | 83 | |
| Elongation CD [2] | EN ISO 12319 | % | 98 | 105 | 92 | 99 | |

[1] MD refers to machine direction,
[2] CD refers to cross direction.

TABLE 9

| Formulation | | | 1 | 2 | 3 | 4 | 5 |
|---|---|---|---|---|---|---|---|
| Polypropylene HF420FB | | | 100 | 96 | 96 | 96 | 96 |
| 70% MB Invention 1 | | | | 4 | | | |
| 70% MB PA1 | | | | | 4 | | |
| 70% MB Invention2 | | | | | | 4 | |
| 70% MB PA2 | | | | | | | 4 |
| Tests | Norm | Unit | | | | | |
| | | On Filaments | | | | | |
| Linear density | | dtex | | 9.7 | 9.6 | 9.9 | 10.1 |
| Tenacity | | cN/tex | | 22.6 | 21.2 | 20.5 | 21.7 |

TABLE 9-continued

| Formulation | | | 1 | 2 | 3 | 4 | 5 |
|---|---|---|---|---|---|---|---|
| Elongation | | % | 260 | 235 | | 248 | 234 |
| Tensile index | | — | 364 | 325 | | 323 | 332 |
| | | On Nonwoven | | | | | |
| Fabric weight | EN ISO 9864 | g/m² | 354 | 382 | | 359 | 378 |
| Coefficient CBR | EN ISO12236 | N/g | 6.8 | 6.9 | | 6.9 | 7.7 |
| CBR | EN ISO12236 | N | 2383 | 2632 | | 2483 | 2899 |
| Tensile Strength (MD + CD)/2 | EN ISO 12319 | N/g | 10.3 | 9.2 | | 9.5 | 9.1 |

[1] MD refers to machine direction,
[2] CD refers to cross direction.

70% MB Invention1 refers to 70 wt % of a masterbatch of 28 wt % PP Lumicene MR 2001 a metallocene homo-polypropylene with MFR 25 g/10 min. (230° C., 2.16 kg, ISO 1133) from Total Petrochemicals and 2 wt % Irgastab FS 301, processing and thermal stabilizer from BASF and 70 wt % of $CaCO_3$ according to the present invention, wherein the treated $CaCO_3$ has a median particles size diameter $d_{50}$ of 0.8 μm, a top cut of $d_{98}$ of 3 μm, and a BET specific surface area of 6 m²/g.

70% MB Invention2 refers to 70 wt % of a masterbatch of 28 wt % PP HF420FB, a homo-polypropylene with MFR 19 g/10 min. (230° C., 2.16 kg, ISO 1133) from Borealis and 2 wt % Irgastab FS 301, processing and thermal stabilizer from BASF and 70 wt % of $CaCO_3$ according to the present invention, wherein the treated $CaCO_3$ has a median particles size diameter $d_{50}$ of 0.8 μm, a top cut of $d_{98}$ of 3 μm, and a BET specific surface area of 6 m²/g.

70% of MA PA1 refers to 70 wt % of a masterbatch of 28 wt % PP Lumicene MR 2001 a metallocene homo-polypropylene with MFR 25 g/10 min. (230° C., 2.16 kg, ISO 1133) from Total Petrochemicals and 2 wt % Irgastab FS 301, processing and thermal stabilizer from BASF and 70 wt % of a wet ground surface treated $CaCO_3$ of the prior art, and the $CaCO_3$ has a median particle size diameter $d_{50}$ of 1.7 μm and a top cut of $d_{98}$ of 6 μm.

70% of MA PA2 refers to 70 wt % of a masterbatch of 28 wt % PP Lumicene MR 2001 a metallocene homo-polypropylene with MFR 25 g/10 min. (230° C., 2.16 kg, ISO 1133) from Total Petrochemicals and 2 wt % Irgastab FS 301, processing and thermal stabilizer from BASF and 70 wt % of a wet ground surface treated $CaCO_3$ of the prior art, and the $CaCO_3$ has a median particle size diameter $d_{50}$ of 1.7 μm and a top cut of $d_{98}$ of 6 μm.

As can be seen from the inventive example 2 from table 8, the tensile properties, especially the tenacity and the tensile index are significantly improved compared to the comparative examples 3 and 5. The inventive examples 2 and 4 from table 9 show the same improvement compared to the comparative example 5. Example 1 being the unfilled polypropylene PP HF420FB.

It lies within the scope of the present invention that the polypropylenes mentioned are not the only one and that other PP polymers or PE polymers or a mix of PP and PE polymers are suitable as well to be used for producing a masterbatch comprising the $CaCO_3$ of the present invention.

The polypropylene masterbatch comprising the $CaCO_3$ according to the present invention can be used for the production of mono filaments, tapes, multifilaments. Such filaments can either be spundbond or meltblown and be readily made in to non-woven such as listed here below.

Hygiene (baby diapers, feminine hygiene, adult incontinence, nursing pads
Wipes (medical wipes, industrial wipes, household wipes)
Agro textiles (crop protection, capillary mats, greenhouse shading, root, control, seed blankets)
Geotextiles (road/rail building, dam/canal lining, sewer liners, soil stabilization, drainage, golf/sport surfaces, roofing, insulation)
Medical (face masks, head wear, shoe covers, disposable clothing, wound dressings, sterilisation aids)
Filtration (air filters, liquid filters, tea bags, coffee filters)
Technical (cable wrapping, floppy disk liners)
Automotive (head liners, insulation door panels, air filters, battery separators, floor coverings)
Upholstery (artificial leather)
Household (wall covering, table decoration, floor coverings)
Use in Concrete Table 10, shows the use of the mineral material of the present invention in different amounts in a standard concrete mixture compared with a filler of the prior art.

| Designation | Sand SAN099 (density 2.65 g/ml) g | Cement CEM099 (density 3.1 g/ml) g | CaCO3 (density 2.7 g/ml) wt % | CaCO3 (density 2.7 g/ml) g | added water g | additive g | mass air g | mass water g | density g/ml | Rc24h Mpa | Rc28d Mpa | Water/binder ratio |
|---|---|---|---|---|---|---|---|---|---|---|---|---|
| Ref | 1750 | 525 | 0.0 | 0 | 157 | 0 | 1032 | 598 | 2.38 | 11.4 | 22.6 | 0.30 |
| PA1 | 1655 | 525 | 10.0 | 52.5 | 173 | 0 | 1085 | 623 | 2.35 | 13.8 | 22.5 | 0.33 |
| PA1 | 1608 | 525 | 15.0 | 78.8 | 181 | 0 | 1132 | 639 | 2.30 | 22.4 | 35.3 | 0.34 |
| Ref | 1750 | 525 | 0.0 | 0 | 157 | 0 | 1042 | 603 | 2.37 | 11.6 | 21.8 | 0.30 |
| IN1 | 1655 | 525 | 10.0 | 52.5 | 173 | 0 | 1117 | 634 | 2.31 | 17.4 | 33.3 | 0.33 |
| IN1 | 1608 | 525 | 15.0 | 78.8 | 181 | 0 | 1194 | 683 | 2.34 | 37.8 | 72.5 | 0.34 |

In a specific embodiment the $CaCO_3$ of the present invention is a non-treated natural ground $CaCO_3$ having a medium particle size diameter of $d_{50}$ of 0.8 µm a top cut $d_{98}$ of 3 µm and a BET surface area of 6 $m^2/g$ which was mixed with a standard sand SAN099 as defined in Standard EN 196-1, Cement CEM I 42.5N (CEM099), with different amount of $CaCO_3$ filler, wherein 0 wt %, 10 wt % and 15 wt % of $CaCO_3$ fillers are based on the weight of the cement binder. The concrete mixture further comprised water in amounts adapted to achieve the same workability. The present examples were prepared without further additives. The concrete mixture have the same volume of 986 ml. Said volume being calculated as: [mass sand]/[density sand]+[mass cement]/[density cement]+[volume water].

Of course, other additives well known in the art could be added to the concrete mix without departing from the scope of the present invention. For example one could add water reducing agents, retarding agents, accelerating agents, super-plasticizers, corrosion inhibiting agents, pigments, surfactants, air entraining agents and others well known to the skilled person.

The method of preparing the concrete mixture according to table 10 and evaluation of the results is made according to the description of the US patent application US 2012/0227632 of the same applicant.

PA1 refers to a non-treated natural ground $CaCO_3$ of the prior art having a medium particle size diameter of $d_{50}$ of 1.4 µm a top cut $d_{98}$ of 5 µm and a BET surface area of 5.5 $m^2/g$.

IN1 refers to a non-treated natural ground CaCO3 of the present invention, wherein the CaCO3 has medium particle size diameter of $d_{50}$ of 0.8 µm a top cut $d_{98}$ of 3 µm and a BET surface area of 6 $m^2/g$.

Ref refers to a concrete mixture reference without $CaCO_3$ at all.

Rc refers to compression resistance also known as compressive strength measurements after 24 hrs and 28 days of maturation of the concrete samples, which were carried out according to the method as described in US 2012/0227632 of the same applicant and EN 196-1. With the $CaCO_3$ of the present inventions the stabilities compared to the prior art were increased by about 25% at 10 wt % of filler, and about 270% at 15 wt % of filler after 24 hrs. After 28 days, the stability was increased by about 50% at 10 wt % of filler and by about 100% at 15 wt % of filler compared to the filler of the prior art.

The invention claimed is:

1. A process for preparing a ground mineral material in the absence of a dispersing agent consisting of the steps of:
   a) wet grinding mineral material in at least one grinding step in an aqueous suspension or slurry in the absence of a dispersing agent until the mineral material has a weight median particle diameter $d_{50}$ from 1.1 µm to 1.5 µm, wherein the mineral material is selected from the group consisting of marble, chalk, dolomite, calcite, limestone, magnesium hydroxide, talc, gypsum, titanium oxide, and any mixture thereof;
   b) up-concentrating or dewatering the aqueous suspension or slurry of step a) in the absence of a dispersing agent to achieve a solids content of between 50% and 70%;
   c) drying the aqueous suspension or slurry of step a) or b) to achieve a solid content of 99.8%, wherein no dispersing agent is present in the mineral material so obtained; and
   d) optionally surface treating the mineral material obtained in step c) with at least one aliphatic carboxylic acid; and
   e) optionally de-agglomerating the mineral material after step d), wherein the calcium carbonate after grinding in step a) and before optional treatment in step d) has a $BET/N_2$ specific area of from 3 $m^2/g$ to 13 $m^2/g$, wherein the mineral material obtained in step c) has a top cut $d_{98}$ of 1.8 µm-5.9 µm.

2. The process according to claim 1, wherein the mineral material is wet ground in step a) until the mineral material has a weight median particle diameter $d_{50}$ of 1.1 µm.

3. The process according to claim 1, wherein the mineral material is wet ground in step a) until the mineral material has a weight median particle diameter $d_{50}$ of 1.5 µm.

4. The process according to claim 1, wherein in step b) the aqueous suspension or slurry is up-concentrated or dewatered to achieve a solids content of between 55% and 65%.

5. The process according to claim 1, wherein in step b) the aqueous suspension or slurry is up-concentrated or dewatered to achieve a solids content of 60%.

6. The process according to claim 1, further comprising a de-agglomeration step e) after step d).

7. The process according to claim 1, wherein the mineral material is wet ground in step a) at a solids content of from 10 wt % to 40 wt %.

8. The process according to claim 1, wherein the mineral material is wet ground in step a) at a solids content of from 20 wt % to 30 wt %, and step b) uses up-concentrating which is carried out by centrifugation.

9. The process according to claim 1, wherein the mineral material is selected from the group consisting of marble, chalk, dolomite, calcite, limestone, and any mixture thereof.

10. The process according to claim 1, wherein the up-concentrating of step b) is carried out by mechanical and/or thermal means.

11. The process according to claim 1, wherein the drying in step c) is carried out by atomizing, spray drying, drying in a rotational oven, drying in a pond, jet-drying, fluid bed drying, freeze drying, fluidized spray drying, or fountain nozzle drying.

12. The process according to claim 1, wherein the drying in step c) is carried out by spray drying.

13. The process according to claim 1, wherein step d) takes place and the at least one aliphatic carboxylic acid is selected from the group consisting of butanoic acid, pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, lignoceric acid, and any mixture thereof.

14. The process according to claim 1, wherein the mineral matter in step a) is calcium carbonate.

* * * * *